United States Patent
Watanabe

(10) Patent No.: US 8,915,527 B2
(45) Date of Patent: Dec. 23, 2014

(54) WORKPIECE TAKING-OUT METHOD USING ROBOT INCLUDING HOLDING NAILS

(71) Applicant: Fanuc Corporation, Yamanashi (JP)

(72) Inventor: Hideyuki Watanabe, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 13/777,838

(22) Filed: Feb. 26, 2013

(65) Prior Publication Data

US 2013/0259632 A1     Oct. 3, 2013

(30) Foreign Application Priority Data

Mar. 28, 2012  (JP) ................................. 2012-073485

(51) Int. Cl.
| | |
|---|---|
| *B25J 15/00* | (2006.01) |
| *B25J 17/02* | (2006.01) |
| *B65G 49/00* | (2006.01) |
| *B25J 15/08* | (2006.01) |

(52) U.S. Cl.
CPC ............... *B65G 49/00* (2013.01); *B25J 15/08* (2013.01); *Y10S 901/31* (2013.01); *Y10S 901/46* (2013.01)
USPC ............ 294/99.1; 294/119.1; 901/31; 901/46

(58) Field of Classification Search
USPC .............. 294/99.1, 119.1, 33, 34, 100, 110.1, 294/207, 86.4, 902; 901/30, 31, 36, 39, 46
See application file for complete search history.

(56) References Cited

U.S. PATENT DOCUMENTS

| | | | | | |
|---|---|---|---|---|---|
| 1,909,813 | A | * | 5/1933 | Crosbie ...................... | 294/119.1 |
| 3,204,997 | A | * | 9/1965 | De Vries ..................... | 294/86.4 |
| 3,756,096 | A | * | 9/1973 | Bolden ............................ | 81/13 |
| 4,647,097 | A | * | 3/1987 | Lessway ...................... | 294/195 |
| 4,653,794 | A | * | 3/1987 | Atlas ............................. | 294/207 |
| 4,699,414 | A | * | 10/1987 | Jones ........................ | 294/119.1 |
| 4,723,806 | A | * | 2/1988 | Yuda .......................... | 294/119.1 |
| 4,808,898 | A | * | 2/1989 | Pearson .......................... | 901/38 |
| 4,900,078 | A | * | 2/1990 | Bloch ............................ | 901/36 |
| 5,253,912 | A | * | 10/1993 | Andorlini et al. .......... | 294/119.1 |
| 5,323,674 | A | * | 6/1994 | Fidkowski ..................... | 81/487 |
| 5,538,305 | A | * | 7/1996 | Conway et al. ............ | 294/119.1 |

FOREIGN PATENT DOCUMENTS

| | | |
|---|---|---|
| JP | 62-131791 | 8/1987 |
| JP | 63-144298 A | 6/1988 |

(Continued)

OTHER PUBLICATIONS

Notification of Reasons for Rejections issued in 2012-073485 dated Jun. 25, 2013, 4 pages. (w/English Translation).

*Primary Examiner* — Paul T Chin
(74) *Attorney, Agent, or Firm* — Lowe Hauptman & Ham, LLP

(57) ABSTRACT

Before chuck 20 is opened, coil spring 22 is compressed, and coil spring 22 applies downward force to holding nails 24. Accordingly, when the chuck 20 is opened, resultant force that opens the chuck 20 and the restoring force of the coil spring 22 causes the holding nails 24 to automatically move in oblique downward directions. As a result, the holding nails 24 move to positions that are laterally close to the holding target workpiece 26*a*. At this time, when other workpieces 26*b* and 26*c* neighbor the holding target workpiece 26*a*, the holding nails 24 can move the neighboring workpieces 26*b* and 26*c* from the workpiece 26*a* so as to flick away the neighboring workpieces 26*b* and 26*c*.

4 Claims, 4 Drawing Sheets

(56) References Cited

FOREIGN PATENT DOCUMENTS

| | | |
|---|---|---|
| JP | 63-169289 | 11/1988 |
| JP | 08-300286 | 11/1996 |
| JP | 9-103983 A | 4/1997 |
| JP | 2010-036304 | 2/2010 |

* cited by examiner

WORKPIECE TAKING-OUT METHOD USING ROBOT INCLUDING HOLDING NAILS

RELATED APPLICATIONS

The present application is based on, and claims priority from, Japanese Application Number 2012-073485, filed Mar. 28, 2012, the disclosure of which is hereby incorporated by reference herein in its entirety.

BACKGROUND OF THE INVENTION

1. Field of the Invention

The present invention relates to a method for taking out a workpiece by using a robot including holding fingers.

2. Description of the Related Art

Conventionally, a technique of using holding fingers provided in a robot hand for taking out a plurality of workpieces close to one another, one after another, by using a robot is well known. For example, in Japanese Unexamined Patent Publication No. 9-103983 disclosing fingers for a robot hand, there is the description "each of fingertip parts 4 of finger forming bodies 1 configured so as to be switchable between a hold posture and a hold-releasing posture is formed of a soft material that has a cylindrical shape in which a base end portion is open, and a free end portion is closed. A back portion 4a and a belly portion 4b of each fingertip part 4 are formed so as to be flat. A separate distance between the back portion 4a and the belly portion 4b of each fingertip part 4 is set in a state in which the back portion 4a and the belly portion 4b are positioned almost on each other. Then, in the hold-releasing posture, the fingertip parts 4 can be inserted into narrow spaces on the lateral sides of a holding target object. In the inserted state, fluid from a fluid supplying unit 3 is supplied to the insides of the fingertip parts 4 so that the back portions 4a and the belly portions 4b can be inflated to be separated from each other. Thereby, in the holding posture, the belly portions 4b are pressed against the holding target object to hold the holding target object".

It is understood that according to the technique of Japanese Unexamined Patent Publication 9-103983, after the fingertip parts formed of the cylindrical soft material are inserted into the narrow spaces on the lateral sides of the holding target object, fluid is then supplied to the insides of the fingertip parts to inflate the fingertip parts, and the fingertip parts thereby hold the holding target object. However, when holding means is formed of the soft material as described above, it can become difficult to accurately and securely hold a target object.

Therefore, an object of the present invention is to provide a workpiece taking-out method that can easily and accurately take out workpieces close to one another, one after another even when rigid holding fingers are used.

SUMMARY OF THE INVENTION

In order to accomplish the above-described object, according to a first invention of the present application provides a method for taking out a holding target workpiece. The method uses a robot in which a robot hand is mounted. The robot hand includes a structure in which a chuck including holding fingers is movable relative to a hand main body, and the chuck is supported by the hand main body via an elastic body in a direction in which the chuck is movable relative to the hand main body. In this method, tip portions of the holding fingers are moved toward the holding target workpiece to press the holding fingers against the holding target workpiece until the elastic body is compressed by a predetermined amount. In a state where the holding fingers apply pre-pressure to the holding target workpiece, the chuck is opened, and resultant force that opens the chuck and restoring force of the compressed elastic body thereby causing the holding fingers to enter positions laterally close to the holding target workpiece. Next, the chuck is closed to cause the holding fingers to hold the holding target workpiece.

According to a second invention, in the first invention, the robot includes detecting means for detecting a position of the chuck relative to the hand main body. In the second invention, when a distance between the hand main body and the chuck detected while the holding fingers are moving is equal to or smaller than a predetermined allowable value, it is determined that the robot hand interfered with an obstacle to stop movement of the robot hand.

These objects, features, and advantages, and other objects, features, and advantages of the present invention will become more apparent from detailed description of typical embodiments of the present invention illustrated in the attached drawings.

DETAILED DESCRIPTION

Figure 1:
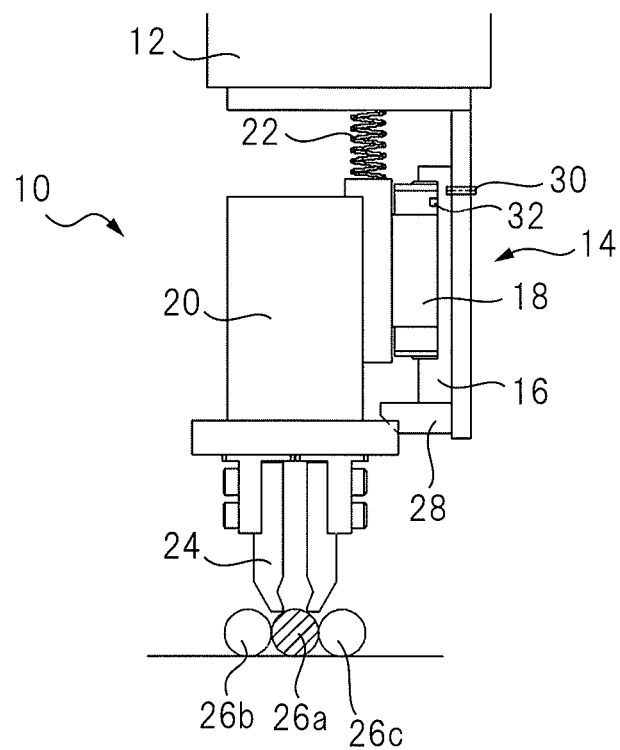
FIG. 1 illustrates one embodiment of a workpiece taking-out apparatus according to the invention of the present application.

FIG. 1 illustrates one embodiment of a workpiece taking-out apparatus for carrying out a workpiece taking-out method according to the present invention. The workpiece taking-out apparatus is a robot that includes a holding type of robot hand 10 positioned at an arm tip thereof and that has a degree of freedom of six axes, for example. In the workpiece taking-out apparatus, a position and a posture of a hand main body 12 of the robot hand 10 schematically illustrated in the drawing can be arbitrarily changed. At a tip of the hand main body 12, a linear guide 14 is provided. Specifically, the linear guide 14 includes a guide rail 16 and a slider 18. The guide rail 16 is attached at the tip of the hand main body 12 so as to extend in the upward and downward directions when the hand main body 12 is directed downward as in FIG. 1. The slider 18 can linearly move relative to the guide rail 16.

At the slider 18, a chuck 20 is attached. Accordingly, the chuck 20 can move relative to the hand main body 12 in a direction in which the guide rail 16 extends. The chuck 20 is linked to the tip of the hand main body 12 or to the linear guide 14 by pressing means 22 such as a coil spring. The pressing means 22 presses the chuck 20 in the direction in which the guide rail 16 extends. The chuck 20 includes at least two holding fingers 24 on a tip side thereof. Preferably, the holding fingers 24 are rigid. The holding fingers 24 can be opened and closed so that the holding fingers 24 can hold and release a workpiece 26a (for example, illustrated as a globular object in the drawing) that is a holding target. In the present embodiment, the pressing means 22 is described as the coil spring. However, according to the present invention, the pressing means 22 is not limited to the coil spring, and may be a different elastic body that generates predetermined restoring force when this different elastic body is compressed or deformed. An example of such a different elastic body is a torsion spring, a leaf spring, or the like, instead of the coil spring.

The workpiece taking-out apparatus includes a stopper 28 for preventing the chuck 20 from being separated from the tip of the hand main body 12 by a distance equal to or larger than a predetermined distance, in the direction in which the guide rail 16 extends. In an example illustrated in the drawing, the stopper 28 is provided at a tip of the guide rail 16, and when the chuck 20 becomes separated from the hand main body 12 by the predetermined distance, the stopper 28 contacts against the chuck 20 or the slider 18 to prevent the chuck 20 or the slider 18 from moving further.

The workpiece taking-out apparatus further includes detecting means 30 for detecting a position of the chuck 20 relative to the hand main body 12 in the direction in which the guide rail 16 extends. In an example illustrated in the drawing, the detecting means 30 is a sensor provided at a position in the linear guide 14 substantially integrated with the guide rail 16. This sensor may be a photo sensor or the like. In the example illustrated in the drawing, when a mark 32 provided at the slider 18 that moves integrally with the chuck 20 comes to a position laterally close to the sensor 30 (refer to FIG. 3 mentioned later), the sensor 30 can detect this positional relation.

As described above, the workpiece taking-out apparatus includes the robot hand including a structure in which the chuck 20 including the holding fingers 24 can move relative to the hand main body 12 by the linear guide 14, the chuck 20 is supported by the hand main body 12 via the pressing means 22 in the moving direction of the chuck 20. In the following, the workpiece taking-out method using the workpiece taking-out apparatus will be described.

Figure 2:
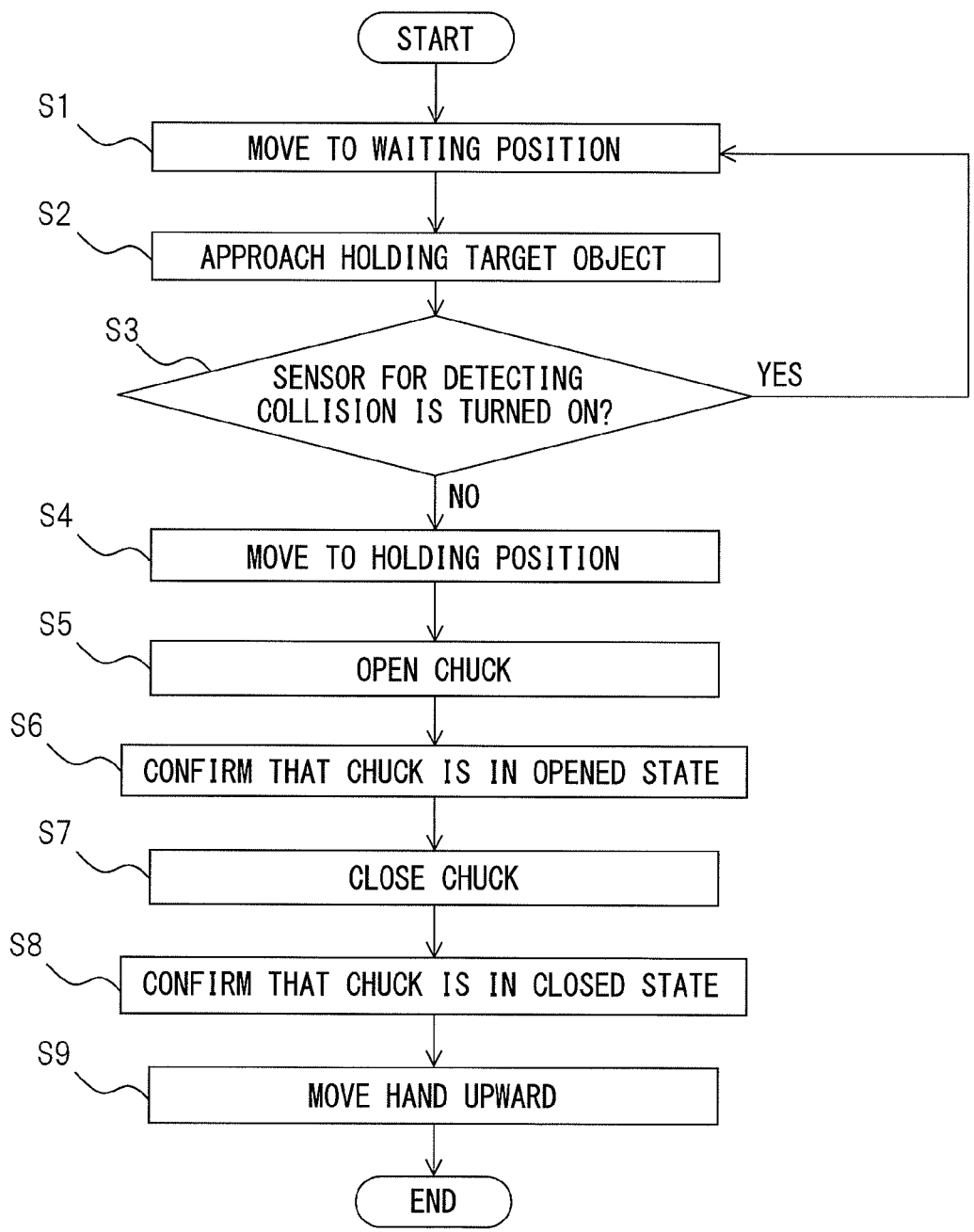
FIG. 2 is a flowchart showing a procedure for taking out a workpiece.

FIG. 2 is a flowchart showing a workpiece taking-out procedure that uses the workpiece taking-out apparatus according to the present invention. First, the robot is manipulated to move the hand main body 12 to a waiting position (step S1). The waiting position is a position from which the holding fingers 24 can approach a taking-out target workpiece 26*a* without interfering with other surrounding objects or the like. For example, when the chuck is at the waiting position, tips of the holding fingers 24 are separate in the vertical upward direction from the holding fingers 24 of the state of FIG. 1 by a fixed distance (for example, 5 cm to 20 cm) so as to be separate from the workpiece 26*a* by the fixed distance in the vertical upward direction.

Figure 3:
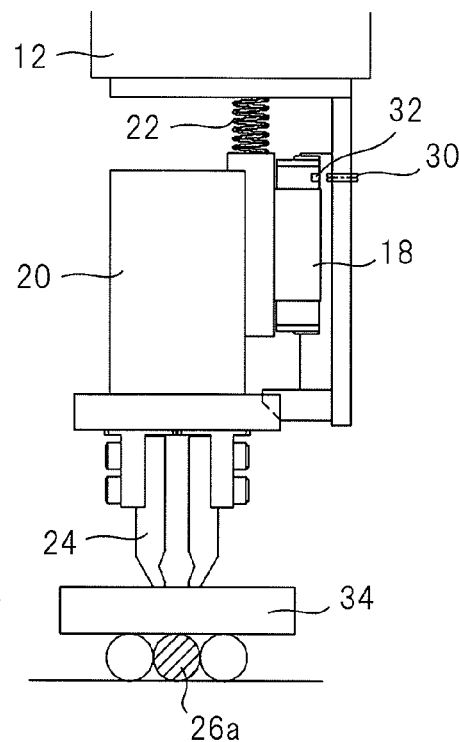
FIG. 3 illustrates a state where holding fingers interfere with an obstacle.

Then, operation for approaching the workpiece 26*a* that is the holding target object is performed (step S2). Specifically, as illustrated in FIG. 1, the hand main body 12 is moved downward such that the tip portions of the holding fingers 24 are moved to contact against the workpiece 26*a* that is the holding target object. As illustrated in FIG. 3, when the sensor 30 detects that the mark 32 of the slider 18 is positioned on the lateral side of the sensor 30 (the sensor 30 is turned on), i.e., when a distance between the hand main body 12 and the chuck 20 becomes equal to or smaller than a predetermined allowable value, the holding fingers 24 do not contact against the workpiece 26*a*. This state means that some obstacle 34 exists between the holding fingers 24 and the workpiece 26*a*, and that the coil spring 22 is excessively compressed. Accordingly, in such a situation, in order to prevent the holding fingers and the workpiece from being damaged, the downward movement of the hand main body 12 is stopped by robot control, the procedure returns to the step S1 (i.e., the hand main body 12 moves to the waiting position), and a measure such as removing of the obstacle 34 is taken.

As illustrated in FIG. 3, a positional relationship between the sensor 30 and the mark 32 may be adjusted such that the sensor 30 is turned on before a compressed amount of the coil spring 22 reaches the maximum thereof. Thereby, even when the holding fingers 24 interfere with the obstacle 34, the impact due to this interfering can be relieved by the coil spring 22.

When such inconvenience as illustrated in FIG. 3 is not generated (i.e., in a state where the sensor 30 is off), the hand main body 12 is moved to a holding position (step S4). Specifically, while the holding fingers 24 are maintained to contact against the workpiece 26*a*, the hand main body 12 is moved downward to press the holding fingers 24 against the workpiece 26*a* until the coil spring 22 is compressed by a predetermined amount. In other words, in the state of FIG. 1, because of restoring force of the coil spring 22, pre-pressure acts on the workpiece 26*a* via the holding fingers 24.

Figure 4:
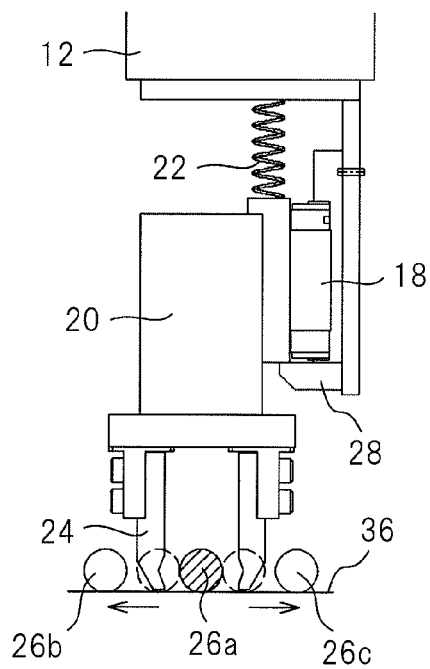
FIG. 4 illustrates a state where a chuck is opened to cause the holding fingers to enter positions on the lateral sides of a holding target workpiece, and thereby, neighboring workpieces are flicked away.

Then, as illustrated in FIG. 4, in the state where the holding fingers 24 apply the pre-pressure to the workpiece 26*a*, opening operation of the chuck 20, i.e., operation of separating the holding fingers 24 (in the right and left directions in an example of the drawing) from each other is performed (step S5). At this time, as described above, before the chuck is opened, the coil spring 22 is compressed, and the coil spring 22 applies downward force to the holding fingers 24. Accordingly, resultant force of force that opens the chuck 20 and the restoring force of the coil spring 22 causes the holding fingers 24 to automatically move in oblique downward directions. As a result, as illustrated in FIG. 1, the holding fingers 24 move to positions that are laterally close to the holding target workpiece 26*a*. At this time, when other workpieces 26*b* and 26*c* neighbor the holding target workpiece 26*a*, the holding fingers 24 can move the neighboring workpieces 26*b* and 26*c* from the workpiece 26*a* so as to flick away the neighboring workpieces 26*b* and 26*c*. In this manner, the neighboring workpieces that become obstacles to the holding target workpiece can be easily separated from the holding target workpiece.

As illustrated in FIG. 4, providing the above-described stopper 28 can restrict the maximum separation distance from the hand main body 12 to the chuck 20 after the restoring force of the coil spring 22 is released. Thereby, the holding fingers 24 can be accurately positioned to the taking-out target workpiece 26*a*. In addition, it is possible to prevent damage to the holding fingers 24 when the holding fingers 24 collide with a bottom surface of a container, a pallet 36 or the like on which the workpiece is arranged.

Figure 5:
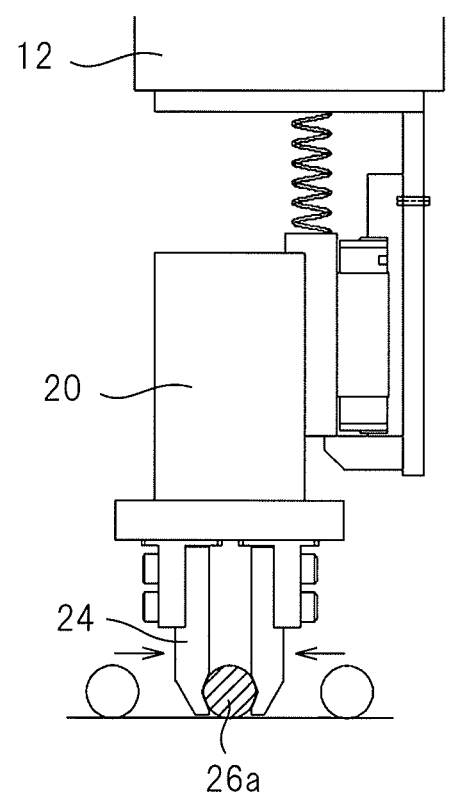
FIG. 5 illustrates a state where the holding fingers hold the holding target workpiece.

At a next step S6, by using a sensor or the like not illustrated in the drawings, it is confirmed that the chuck 20 is in a opened state (i.e., the holding fingers 24 are separate from each other by a predetermined distance). Subsequently, as illustrated in FIG. 5, the chuck 20 is closed (step S7). Thereby, the holding fingers 24 hold the holding target workpiece 26*a*.

Then, by using a sensor or the like not illustrated in the drawings, it is confirmed (step S8) that the chuck 20 is in a closed state (i.e., the holding fingers 24 hold the workpiece 26*a*). Then, the hand main body 12 is moved upward (step S9). The workpiece 26*a* which is taken out in this manner is transferred to a predetermined position not illustrated in the drawings by operation of the robot including the robot hand 10.

According to the present invention, the chuck 20 including the holding fingers 24 is configured to be movable relative to the hand main body 12, and in a state where the holding fingers 24 apply pressure to the taking-out target workpiece 26a by the pressing means, the chuck 20 is opened. Thereby, at the same time that the chuck 20 is opened, the holding fingers 24 are moved in an oblique downward direction to enter the positions laterally close to the target workpiece 26a. Accordingly, as illustrated in FIG. 1, even when other workpieces neighbor the taking-out target workpiece, without using a complicated mechanism, a sensor or the like, these other workpieces can be separated from the target workpiece so that holding fingers can securely hold the target workpiece.

EFFECT OF THE INVENTION

According to the present invention, even in a state where a plurality of workpieces are close to one another, the holding fingers can flick away workpieces other than a holding target workpiece. Accordingly, without using a complicated mechanism or the like, the holding target workpiece can be easily and accurately held to be taken out. When a distance between the hand main body and the chuck becomes equal to or smaller than the predetermined allowable value, movement of the robot hand is stopped so that breakdown due to an obstacle or the like between the holding fingers and the workpiece can be prevented from happening.

The present invention has been described by using typical embodiments. However, a person skilled in the art would understand the above-described alteration, and various other alterations, omissions and additions can be made without departing from the scope of the present invention.

The invention claimed is:

1. A method of taking a target workpiece out of a plurality of workpieces by using a robot including a robot hand, the robot hand including a chuck supported by a hand main body via an elastic member, the chuck including at least two fingers of rigid material and being movable relative to the hand main body, the method comprising:
    moving the hand main body toward the target workpiece so that the fingers apply a pre-pressure against the target workpiece until the elastic member is compressed by a predetermined amount, wherein said pre-pressure is applied against the target workpiece when the fingers are not holding the target workpiece;
    opening the chuck in a state where the fingers apply the pre-pressure against the target workpiece, so that a resultant force of opening the chuck and a restoring force of the compressed elastic member causes the fingers to respectively enter positions laterally close to the target workpiece;
    closing the chuck upon the fingers respectively entering the position, to cause the fingers to hold the target workpiece; and
    taking the target workpiece out of the plurality of workpieces in a state where the chuck is closed.

2. A method of taking a target workpiece out of a plurality of workpieces by using a robot including a robot hand, the robot hand including a chuck supported by a hand main body via an elastic member, the chuck including at least two fingers of rigid material and being movable relative to the hand main body, the method comprising:
    moving the hand main body toward the target workpiece so that the fingers apply a pre-pressure against the target workpiece until the elastic member is compressed by a predetermined amount;
    opening the chuck in a state where the fingers apply the pre-pressure against the target workpiece, so that a resultant force of opening the chuck and a restoring force of the compressed elastic member causes the fingers to respectively enter positions laterally close to the target workpiece;
    closing the chuck upon the fingers respectively entering the position, to cause the fingers to hold the target workpiece;
    taking the target workpiece out of the plurality of workpieces in a state where the chuck is closed;
    detecting a position of the chuck relative to the hand main body;
    determining, when a distance between the hand main body and the chuck while the fingers are moving is equal to or smaller than a predetermined value, that there is an obstacle between the fingers and the workpiece; and
    stopping the movement of the hand main body.

3. An apparatus for taking a target workpiece out of a plurality of workpieces, the apparatus comprising:
    a hand main body;
    an elastic member coupled to the hand main body;
    a robot hand including a chuck supported by the hand main body via the elastic body, the chuck including at least two fingers of rigid material and being movable relative to the hand main body; and
    a controller configured to control the hand main body and the robot hand such that
        the hand main body is moved toward the target workpiece so that the fingers apply a pre-pressure against the target workpiece until the elastic body is compressed by a predetermined amount, wherein the controller is configured to cause the fingers to apply said pre-pressure against the target workpiece when the fingers are not holding the target workpiece,
        the chuck is opened in a state where the fingers apply the pre-pressure against the target workpiece, so that a resultant force of opening the chuck and a restoring force of the compressed elastic body causes the fingers to respectively enter positions laterally close to the target workpiece,
        the chuck is closed upon the fingers respectively entering the position, to cause the fingers to hold the target workpiece, and
        the target workpiece is taken out of the plurality of workpieces in a state where the chuck is closed.

4. An apparatus for taking a target workpiece out of a plurality of workpieces, the apparatus comprising:
    a hand main body;
    an elastic member coupled to the hand main body;
    a robot hand including a chuck supported by the hand main body via the elastic body, the chuck including at least two fingers of rigid material and being movable relative to the hand main body;
    a controller configured to control the hand main body and the robot hand such that
        the hand main body is moved toward the target workpiece so that the fingers apply a pre-pressure against the target workpiece until the elastic body is compressed by a predetermined amount,
        the chuck is opened in a state where the fingers apply the pre-pressure against the target workpiece, so that a resultant force of opening the chuck and a restoring force of the compressed elastic body causes the fingers to respectively enter positions laterally close to the target workpiece,
        the chuck is closed upon the fingers respectively entering the position, to cause the fingers to hold the target workpiece, and the target workpiece is taken out of the plurality of workpieces in a state where the chuck is closed;
a detecting unit configured to detect a position of the chuck relative to the hand main body; and
a determining unit configured to determine, when a distance between the hand main body and the chuck while the fingers are moving is equal to or smaller than a predetermined value, that there is an obstacle between the fingers and the workpiece, wherein
the controller is configured to stop, when the determining unit determines that there is an obstacle between the fingers and the workpiece, the movement of the hand main body.

* * * * *